US012528695B2

(12) United States Patent
Rende

(10) Patent No.: US 12,528,695 B2
(45) Date of Patent: Jan. 20, 2026

(54) TORSION SPRING ELEMENT

(71) Applicant: NORTHROP GRUMMAN LITEF GMBH, Freiburg (DE)

(72) Inventor: Jan Daniel Rende, Herbolzheim (DE)

(73) Assignee: NORTHROP GRUMMAN LITEF GMBH, Freiburg (DE)

(*) Notice: Subject to any disclaimer, the term of this patent is extended or adjusted under 35 U.S.C. 154(b) by 710 days.

(21) Appl. No.: 17/923,031

(22) PCT Filed: May 5, 2021

(86) PCT No.: PCT/EP2021/061903
§ 371 (c)(1),
(2) Date: Nov. 3, 2022

(87) PCT Pub. No.: WO2021/224347
PCT Pub. Date: Nov. 11, 2021

(65) Prior Publication Data
US 2023/0219805 A1   Jul. 13, 2023

(30) Foreign Application Priority Data
May 6, 2020   (DE) ...................... 10 2020 112 267.5

(51) Int. Cl.
*B81B 3/00*   (2006.01)
(52) U.S. Cl.
CPC .... *B81B 3/0062* (2013.01); *B81B 2203/0163* (2013.01); *B81B 2203/0307* (2013.01); *B81B 2203/055* (2013.01); *B81B 2203/058* (2013.01)

(58) Field of Classification Search
CPC .......... B81B 3/0062; B81B 2203/0163; B81B 2203/0307; B81B 2203/055; B81B 2203/058; B81B 7/00
See application file for complete search history.

(56) References Cited

U.S. PATENT DOCUMENTS

2017/0359003 A1* 12/2017 Liu ...................... B81B 3/0062
2019/0234991 A1   8/2019 Kihara

FOREIGN PATENT DOCUMENTS

DE   102017011821 A1 *  8/2018  ........... B81B 3/0072

OTHER PUBLICATIONS

Machine translation of DE 102017011821 A1 (Year: 2018).*
International Preliminary Report on Patentability (IPRP) mailed Nov. 10, 2022.
International Search Report and Written Opinion issued in connection with corresponding PCT Patent Application No. PCT/EP2021/061903 dated Jul. 26, 2021.

(Continued)

*Primary Examiner* — Steven B Gauthier
*Assistant Examiner* — Sun Mi Kim King
(74) *Attorney, Agent, or Firm* — Tarolli, Sundheim, Covell & Tummino LLP

(57) ABSTRACT

A frame (110) is rotatably coupled to a substrate (200) by way of a torsion spring element (100), wherein the frame (110) can be both twisted in relation to the substrate (200) and moved linearly in relation to said substrate (200). The torsion spring element (100) is made of a single piece and suitable for use in micro-electromechanical devices.

6 Claims, 6 Drawing Sheets

(56) References Cited

OTHER PUBLICATIONS

Joo et al., "Compliant Manipulators", In: Handbook of Manufacturing Engineering and Technology. London: Springer London, pp. 1-63, Jan. 1, 2014 (Jan. 1, 2014), ISBN: 978-1-4471-4976-7. XP055827495, figure I(b), p. 2-p. 3.

Chen et al. "A 3-DOF flexure-based fixture for passive assembly of optical switches", Advanced Intelligent Mechatronics, Proceedings, 2005 Ieeeiasme, International Conference on Monterey, CA Jul. 24-28, 2005, Piscataway, NJ, USA, IEEE, Jul. 24, 2005 (Jul. 24, 2005). pp. 618-623, DOI: 10.1109/AIM.2005.1511051, ISBN: 978-0-7803-9047-8. XP032391504, figure 7, section "C. Simulation and Test of Fixture".

\* cited by examiner

TORSION SPRING ELEMENT

RELATED APPLICATIONS

The present invention is a U.S. National Stage Patent Application, claiming priority to Serial No. PCT/EP2021/061903, filed on May 5, 2021, which claims priority from German Patent Application No. 10 2020 112 267.5, filed on May 6, 2020; the entireties of both are hereby incorporated herein by reference.

The present invention relates to a torsion spring element suitable for performing both rotational and translational movements.

Micro-electro-mechanical systems (MEMS) often use spring mechanisms that are highly specialized. Such spring mechanisms, for example, can enable a very well guided, straight-line movement with very good linearity of the force-displacement curve along one direction, while no movement is possible in directions perpendicular to this, to a first approximation. Similarly, torsion springs are well known that enable purely rotational movements without linear movement.

In modern and complex MEMS designs, however, spring mechanisms have to fulfill various tasks, which often cannot be achieved with the previously used spring mechanisms specialized in one type of movement. Rather, different spring mechanisms must be combined with each other, such as a torsion spring and a linear spring. This inevitably leads to a large space requirement. In addition, the individual spring mechanisms can block each other so that the optimally achievable deflections of the individual spring mechanisms cannot be achieved in this combination. The large space requirement also increases the risk of process fluctuations occurring over the surface of the combined spring mechanism during fabrication of the MEMS, e.g., by etching, due to which spring characteristics vary within the spring mechanism.

It is therefore the object of the present invention to provide a compact torsion spring element that can perform a wide variety of movements. This object is achieved by the subject matter of claim 1.

A torsion spring element that is rotatably connected to a substrate and is suitable for use in micro-electro-mechanical devices can be twisted relative to the substrate, as well as moved linearly relative to the substrate for this purpose and is characterized in that the torsion spring element is designed in one piece.

"Designed in one piece" means that the torsion spring element is not a combination of spring mechanisms that would also function on their own. It is therefore not possible to remove components or connecting elements from the torsion spring element, without seriously impairing the functionality of the torsion spring element. In contrast, with a combination of several spring mechanisms that can also be used individually, the connection between the spring mechanisms can always be removed, without impairing the function of the individual spring mechanisms.

The one-piece design of the torsion spring element makes it possible to achieve a rotatable and simultaneously linearly displaceable mounting of MEMS components above the substrate, without increasing the space required for this.

For this purpose, the torsion spring element can comprise a frame structure, an anchor structure preferably arranged within the frame structure, and spring structures, which connect the anchor structure to the frame structure. In doing so, the anchor structure connects the spring structures and the frame structure to the substrate, and the frame structure, with deformation of the spring structures, moves as a whole relative to the anchor structure to produce rotational movements and linear movements of the torsion spring relative to the substrate.

The torsion spring element thus has an external frame structure that can be used to connect other MEMS components to the torsion spring element. The frame structure shifts and/or twists relative to the substrate and the anchor structure, with deformation of the spring structures that hold the frame structure above the substrate. Both rotations and translations are mediated by the spring structures. Thus, there is no plurality of spring mechanisms. In this way, the torsion spring element can be designed in one piece and compactly. In so doing, the frame structure itself can be more or less rigid. The frame structure can therefore perform rotations and translations in a dimensionally stable manner. However, it can also consist entirely or partially of segments that themselves have spring properties.

The spring structure can comprise at least one pairing of two bending beam springs extending from the anchor structure at an angle not equal to 0°, each having a kink, converging towards each other after the kink, meeting at the frame structure and being connected to the frame structure at that point.

Thus, starting from the anchor structure, two bending beam springs fan out. The distance between the bending beam springs increases with increasing distance from the anchor structure, before the bending beam springs converge again to connect to each other at the frame structure and to the frame structure. The change in direction that occurs in the course of the bending beam springs is herein referred to as a "kink" However, this is only to describe the fact of the change in direction and also includes rounded bends or gradual changes in direction.

The two bending beam springs thus form approximately a quadrangle, one opposite pair of corners of which are the connections to the anchor and frame structures and the other opposite pair of corners of which are the kink points. The corners corresponding to the kink points can be rounded, so that the quadrangle has degenerated into a biconvex lens shape. In doing so, the quadrangle can preferably have the shape of a dragon quadrangle, more preferably the shape of a rhombus, and even more preferably a square shape (or the corresponding degeneration into a lens shape).

Each of the bending beam springs can deform in a well known way. Due to the existing kinks and the opposing connections of the bending beam springs, both linear and rotational movements of the connection point to the frame structure in relation to the connection point to the anchor structure can be produced. If both bending beam springs compress or stretch by the same amount, the two connecting points move towards or away from each other on a straight line. If one bending beam spring compresses while the other stretches, a rotational movement results. By applying different loads to the bending beam springs, different movement patterns can be achieved in a simple way. In particular, linear movements along several directions are possible.

A torsion spring of this type can therefore cope with complex requirement profiles, without having a larger space requirement. In addition, the bending beam springs do not restrict their mutual mobility, whereby maximum deflection can be achieved.

The spring structures can have a plurality of pairings of bending beam springs as described above. Adjacent bending beam springs of different pairings can extend straight and in parallel from the anchor structure to the respective kink Thus, two bending beam springs always run outwards in parallel from the anchor structure. At a predetermined point, the bending beam springs bend or kink away sideways to meet the other bending beam spring of the respective pairing at the frame structure. This stabilizes the torsion spring in several directions. This allows MEMS components to be connected to the torsion spring from different directions. In addition, more movement patterns can thereby be guided safely. This allows the torsion spring to be used more flexibly.

The spring structures can have the plurality of pairings of bending beam springs, with all the bending beam springs of the different pairings extending at the same angle from the anchor structure. This creates a symmetrical design of the torsion spring, which is more stable against loads. This makes the torsion spring more reliable.

The frame structure can be a rectangular frame open on one longitudinal side, and the anchor structure can be a base connected to the substrate and located centrally on the open longitudinal side of the frame. A first bending beam spring runs from the base parallel to the longitudinal direction of the frame to a first end of the frame, kinks at 90° there and runs to a first corner of the frame and is connected to the frame at that point. A second bending beam spring runs from the base perpendicular to the longitudinal direction to a closed longitudinal side of the frame, kinks at 90° there and runs to the first corner of the frame and is connected to the frame at that point. A third bending beam spring runs from the base parallel to the longitudinal direction of the frame and opposite to the first bending beam spring to a second end of the frame, kinks at 90° there and runs to a second corner of the frame and is connected to the frame at that point. A fourth bending beam spring runs from the base parallel to the second bending beam spring perpendicular to the longitudinal direction to the closed longitudinal side of the frame, kinks at 90° there and runs opposite to the second bending beam spring to the second corner of the frame and is connected to the frame at that point. This concrete structure makes it possible to achieve having rectangular torsion spring elements that can perform both rotations and linear movements relative to a substrate.

The frame structure can be a square frame, and the anchor structure can be a base connected to the substrate at the center of the frame. In so doing, eight bending beam springs run in pairs of two parallel running bending beam springs each from the base towards the frame, kink at 90° at the frame and run parallel to the frame to the nearest corner of the frame and are connected to the frame at that point. This concrete structure makes it possible to achieve having square torsion spring elements that can perform both rotations and linear movements relative to a substrate. These square torsion spring elements correspond to a doubling of the rectangular torsion spring elements described above.

The frame structure can also be a circular frame, and the anchor structure can be a base connected to the substrate at the center of the frame. Pairs of two parallel running bending beams can each run like the spokes of a wheel from the base towards the frame, kink at 90° at the frame and run along the frame. Adjacent bending beam springs from adjacent pairs then meet in the middle between their respective kink points and are connected to the frame at that point. This makes it possible to have round torsion spring elements. The spring constant of such torsion springs can be adjusted via the number of "spokes", i.e., via the number of bending beam springs.

With the basic structure of the bending beam springs initially running away from each other and then running towards each other again, which are connected to the anchor structure on one side and to the frame structure on the other side, a variety of different torsion spring elements can therefore be constructed. Common to all these torsion spring elements is that they are designed in one piece and are capable of performing both rotational and linear movements relative to the substrate.

This will be explained further below with reference to the attached figures. However, the following description is purely exemplary. The invention is defined solely by the subject matter of the claims.

In the following text, different variants will, with reference to the figures, be explained for a torsion spring element 100 designed in one piece, which can perform both rotational movements and linear movements relative to a substrate 200 to which it is connected. It goes without saying that not all variants for such torsion spring elements 100 can be discussed. The following explanations are therefore purely exemplary. The compact design of the present torsion spring elements 100 is decisive, which results from the one-piece design with simultaneous suitability for rotation and translation.

Figure 1:
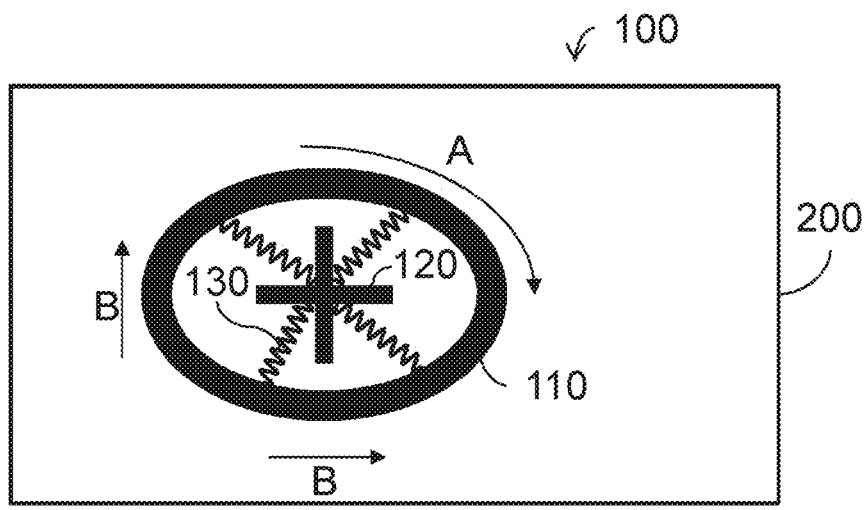
FIG. 1 shows a schematic representation of a torsion spring element.

An example of such a torsion spring element 100 is shown schematically in FIG. 1. The torsion spring element 100 is mounted above a substrate 200 by means of an anchor structure 120. In so doing, the substrate 200 can be considered part of the torsion spring element 100. In particular, the torsion spring element 100 is fabricated from or on the substrate by process steps of semiconductor and/or MEMS technology known per se, e.g., by various etching steps.

Connected to the anchor structure 120 of the torsion spring element 100 are spring structures 130, which connect the anchor structure 120 to a frame structure 110. The frame structure 110, with deformation of the spring structures 130, moves relative to the substrate 200 and the anchor structure 120. Additional components of an MEMS device in which the torsion spring element 100 is used are therefore connected to the frame structure 110.

Frame structure 110, anchor structure 120 and spring structures 130 are only depicted purely symbolically in FIG. 1. Thus, the frame structure 110 and the anchor structure 120 can, in principle, have any shape as long as they can be movably connected by the spring structures 130. The frame structure 110 can also be relatively inflexible or at least in parts have spring properties that also allow relative movements of individual parts of the frame structure 110 against each other, such as vibrations of the various parts in opposite directions. The representation of the spring structures 130 as spiral springs also only serves to symbolically identify their spring properties. The spring structures 130 can have any shape that can be produced using semiconductor and/or MEMS processes that allow the frame structure 110 to be twisted or displaced relative to the anchor structure 120, as depicted by arrows A and B in FIG. 1. In particular, the spring structure 130 may allow any linear movement parallel to the substrate 200, i.e., parallel to the image plane of FIG. 1.

As can already be seen from the schematic representation of FIG. 1, the torsion spring element 100 does not consist of multiple components that can enable rotation or translation on their own, but is built as a single piece. It is therefore not possible to separate the rotation function from the translation function by removing individual components of the torsion spring element 100. The torsion spring element 100 is thus characterized by a compact design, which creates the multifunctionality of the torsion spring element 100.

Figure 2:
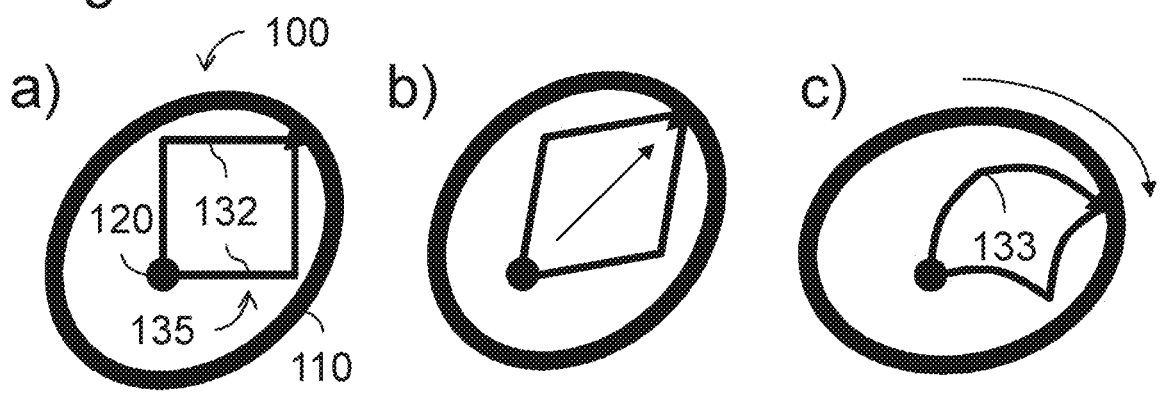
FIG. 2 shows schematic representations of another torsion spring element.

A possible implementation of the torsion spring element 100 is shown in FIG. 2. The torsion spring element 100 has the frame structure 110, which is in principle of any design, within which the anchor structure 120, which is also in principle of any design, is located. Although the frame structure 110 is shown therein as a closed structure, it may also be open. Also, the anchor structure may be located outside the frame structure 110.

Here, the spring structures 130 are a pairing 135 of bending beam springs 132 extending from the anchor structure 120 to the frame structure 110. The bending beam springs 132 initially diverge, have a kink 133 and then run towards each other in such a way that they meet at the frame structure 110 (cf. FIG. 2a)).

As shown in FIGS. 2b) and 2c), this design of the spring structures 130 allows both linear relative movements between frame structure 110 and anchor structure 120 and rotational movements. By deforming the bending beam springs 132 accordingly, various linear movements can also be achieved. In addition to the diagonal movement shown in FIG. 2b), which is produced by the joint compression/stretching of both bending beam springs 132, movements in the horizontal direction can be produced, for example, by the fixed position of the horizontal sections of the paired bending beam springs when the vertically standing sections are deformed. Furthermore, compressing one bending beam spring 132 while simultaneously stretching the other bending beam spring 132 causes the frame structure 110 to rotate about the anchor structure 120. The pairing 135 of bending beam springs 132 thus makes the torsion spring element 100 multifunctional with the smallest space requirement.

Figure 3:
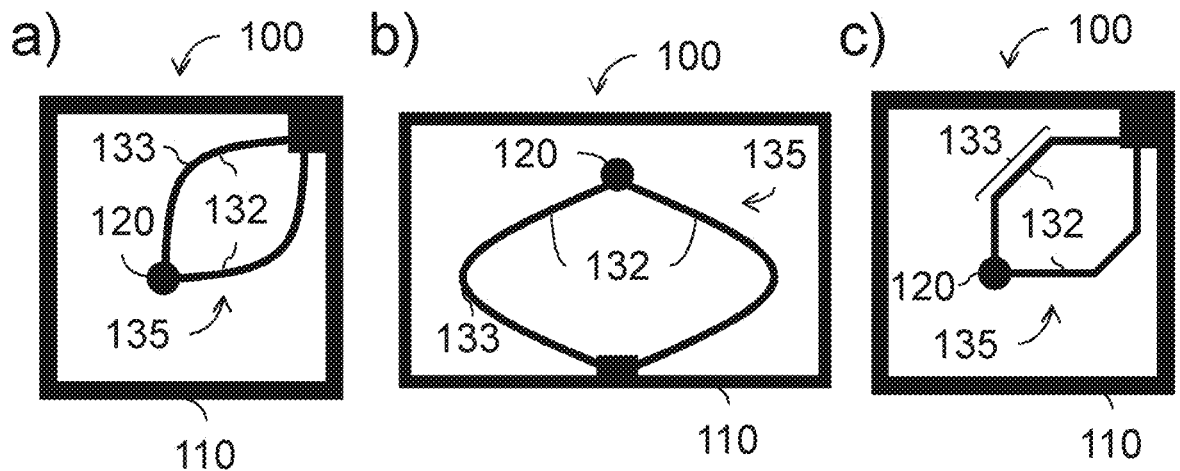
FIG. 3 shows schematic representations of various other torsion spring elements.

The bending beam springs 132 are depicted in FIG. 2 in such a way that they enclose a rectangle or square in the relaxed state. The kink 133 is therefore an abrupt change of direction. As depicted in FIGS. 3a) to 3c), the kink 133 can also be understood more generally as a change of direction that occurs gradually (FIGS. 3a) and 3b)) or in several stages (FIG. 3c)). The decisive factor here is that the bending beam springs 132 initially run away from each other and then towards each other again. However, bending beam springs 132, which consist of straight segments, are easier to fabricate in this process by means of lithographic methods.

The connection between the pairing 135 of bending beam springs 132 and the frame structure 110 can also be formed arbitrarily, in particular, at any point on the frame structure 110. As shown in the figures, the frame structure 110 can have a web or the like into which the bending beam springs 132 open out. However, the bending beam springs 132 can also open out directly into the frame structure 110 and be slightly spaced apart for this purpose. This is harmless as long as imaginary extensions of the bending beam springs 132 intersect in the frame structure 110 or in the area of the frame structure 110.

As will be discussed with reference to the following figures, the spring structures 130 may comprise a plurality of pairings 135 of bending beam springs 132 as described above. This allows the torsion spring element 100 to be stabilized in various directions and the spring constants for linear movements and rotations of the torsion spring element 100 to be set (almost) at will by positioning and designing the bending beam springs 132.

From a process engineering point of view, it can be advantageous if adjacent bending beam springs 132 of adjacent pairings 135 extend in parallel to each other away from the anchor structure 120. The parallel guidance of the bending beam springs 132 facilitates fabrication by means of an etching process, since only a linear trench between the parallel bending beam springs 132 has to be etched.

Figure 4:
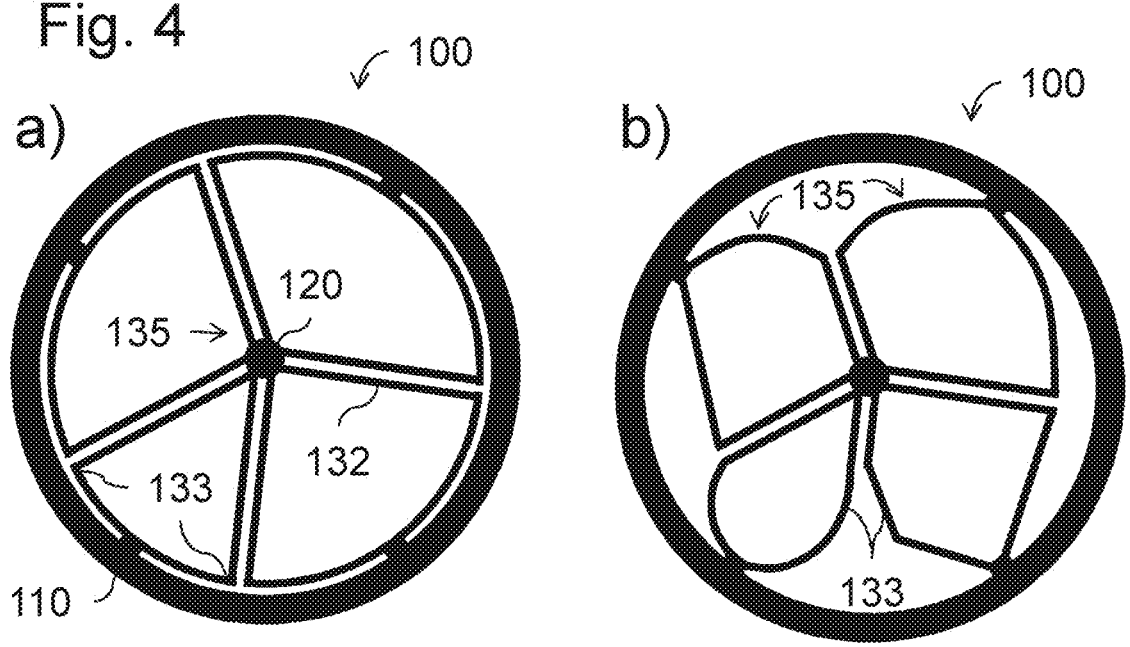
FIG. 4 shows schematic representations of various other torsion spring elements.

As shown in FIG. 4, these parallel bending beam springs 132 may extend radially outwards like the spokes of a wheel before kinking and converging with the other bending beam spring 132 of their pairing 135 towards the frame structure. In this process, the "spokes" can be equally or irregularly distributed around the circumference of the wheel.

As shown in FIG. 4a), the bending beam springs 132 can run up to the frame structure 110 (there a circular frame), kink there and run towards each other parallel to the frame structure. The connection to the frame can then be symmetrical between the kink points 133, for example. However, the connection can also be arranged asymmetrically. This arrangement also has the advantage that the bending beam springs 132, which run parallel to the frame, can be fabricated relatively easily by etching processes by etching a trench between frame structure 110 and bending beam spring 132.

Alternatively, the bending beam springs 132 can also kink in an uncontrolled manner after the parallel course and have, for example, round or stepped kink points 133. The bending beam springs 132 of the different pairings then run towards each other in any shape that is advantageous for the desired spring properties. This allows for greater flexibility.

However, the bending beam springs 132 of different pairings 135 do not necessarily need to extend away from the anchor structure in a parallel manner. There may also be an arbitrary angle between the bending beam springs 132 of adjacent pairings 135. This also increases the flexibility in the design of the torsion spring element 100.

Figure 5:
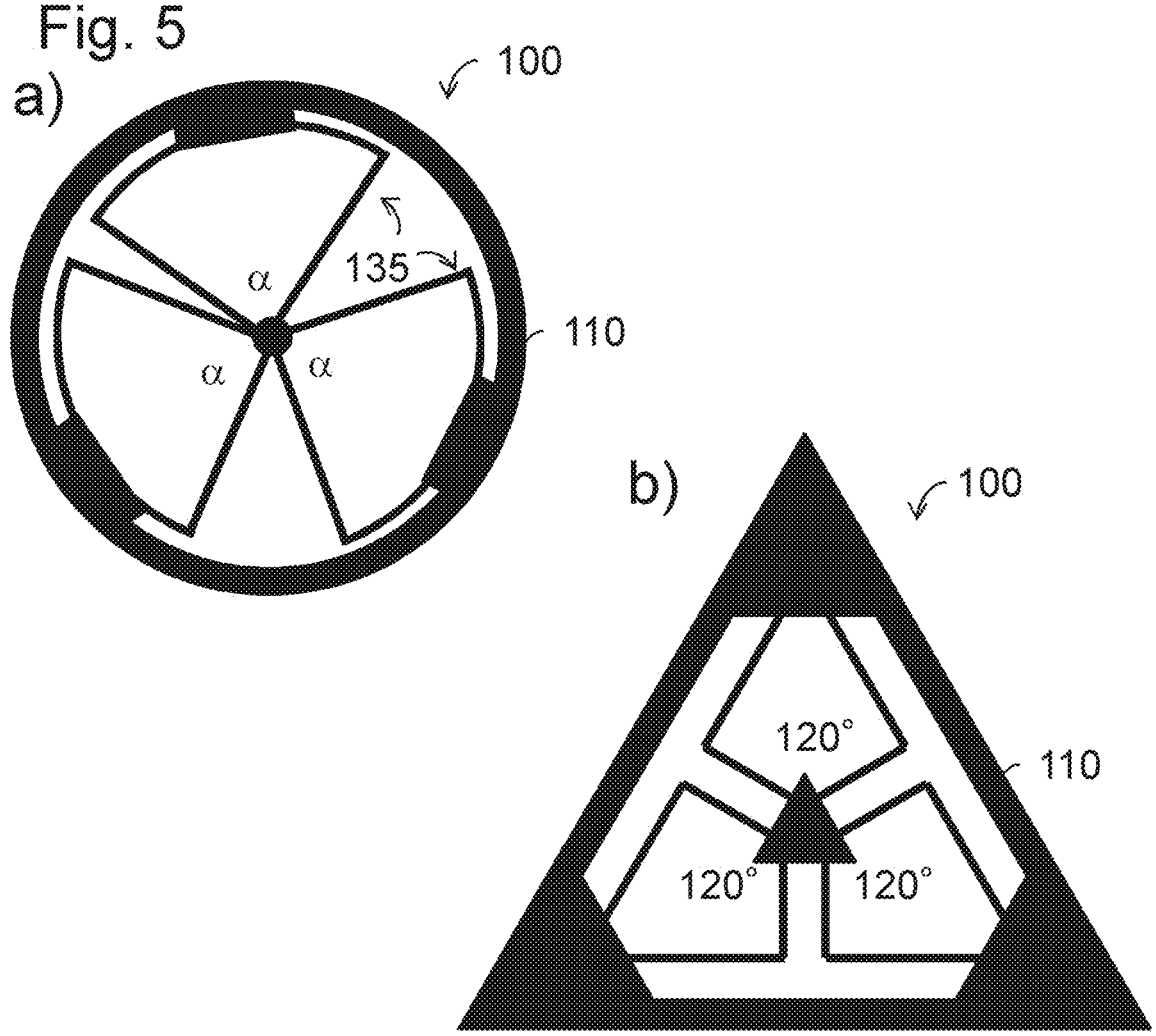
FIG. 5 shows schematic representations of various other torsion spring elements.

Another alternative for the design of the pairings 135 is shown in FIG. 5. This allows the two bending beam springs 132 of each pairing 135 to enclose the same angle α. This allows the spring constant to be kept constant over a greater angular range relative to rotational movements.

Examples of this are shown in FIGS. 5a) and 5b). In FIG. 5a), the sum of the intermediate angles 3a is less than 360°. Adjacent pairings 135 therefore do not have parallel bending beam springs 132. If advantageous, the pairings 135 can be distributed unevenly and non-rotationally symmetrically around the anchor structure 120, as shown in FIG. 5a). However, with a symmetrical design, the linearity of the spring constants improves in relation to rotations.

Particularly advantageous are embodiments in which the torsion spring element 100 is built symmetrically with straightly running bending beam springs 132 that run as parallel as possible to each other and to the frame structure 110. This is shown in FIG. 5b) for a torsion spring element with rotational symmetry for 120° rotations. The bending beam springs 132 of the individual pairings each enclose an angle of 120°. All bending beam springs 132 initially run perpendicular to a triangular frame serving as frame structure 110. In doing so, bending beam springs 132 of adjacent pairings 135 run in parallel. On the frame, all bending beam springs kink at 90° and run towards the corners of the triangular frame. There they open out into webs of the frame structure 110 and thus connect the anchor structure 120, which is formed as a base, to the frame structure 110.

This torsion spring is linear for large angles of rotation. In addition, it has the same spring constant for linear movements in the directions of each of the triangular corners. This torsion spring element 100 is therefore particularly suitable for MEMS with three-count or six-count symmetry, i.e., for example, for a MEMS constructed from honeycombs.

Figure 6:
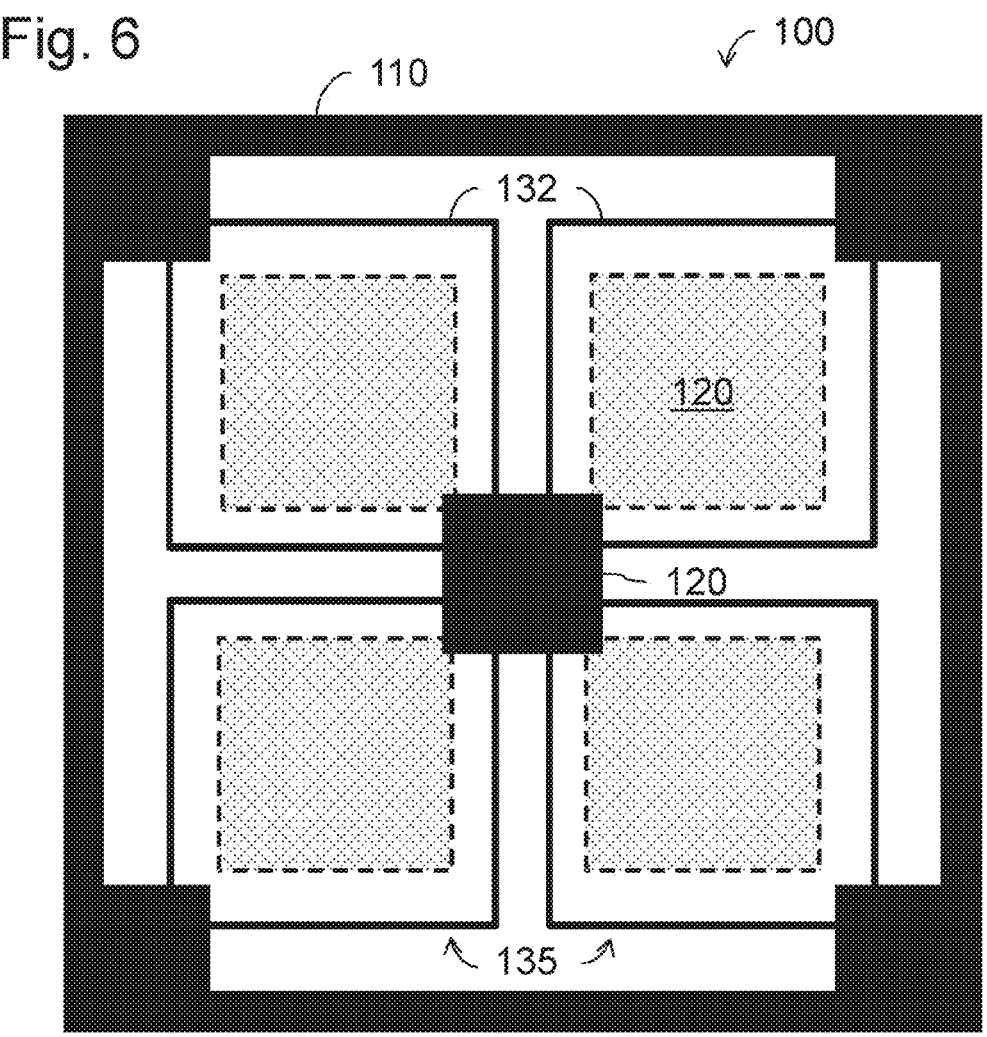
FIG. 6 shows a schematic representation of another torsion spring element.

Similarly, FIG. 6 depicts a torsion spring element 100 suitable for MEMS with a rectangular or square base structure. The torsion spring element 100 has a square frame as frame structure 110. From an anchor structure 120 formed as a base at the center of the square frame, eight bending beam springs initially extend perpendicular to the outer wall of the frame to then kink at 90° at the frame and run parallel to the frame towards the corners of the frame. There they open out into connecting webs or bases. The four pairings 135 of bending beam springs 132 thus each form a square or rectangular frame.

The torsion spring element 100 of FIG. 6 has a highly linear spring constant in relation to rotations. Furthermore, the linear movements of the torsion spring element 100 can be divided into four main directions with respective spring constants. The frame of the torsion spring element 100 can move horizontally, vertically, as well as along the two diagonals of the square. Due to the symmetrical design of the torsion spring element 100, the spring constants for movements in horizontal and vertical direction (i.e., parallel to the sides of the frame) are the same. Similarly, the spring constants for the two diagonal movements are the same, but differ from the spring constant for horizontal/vertical movements.

FIG. 6 also shows a possible variation of the anchor structure 120 using hatched square surfaces. These surfaces lie within the pairings 135 of bending beam springs 132. When fabricating the torsion spring element 100, it may be advantageous to leave such surfaces in an etching process. The bending beam springs 132 can then be formed by etching straight trenches on both sides of the bending beam springs 132. On one side of a bending beam spring 132 the frame structure 110 remains, on the other side the anchor structure 120. As a result, the torsion spring element 110 can be fabricated in a simple manner using well known fabricating processes.

Figure 7:
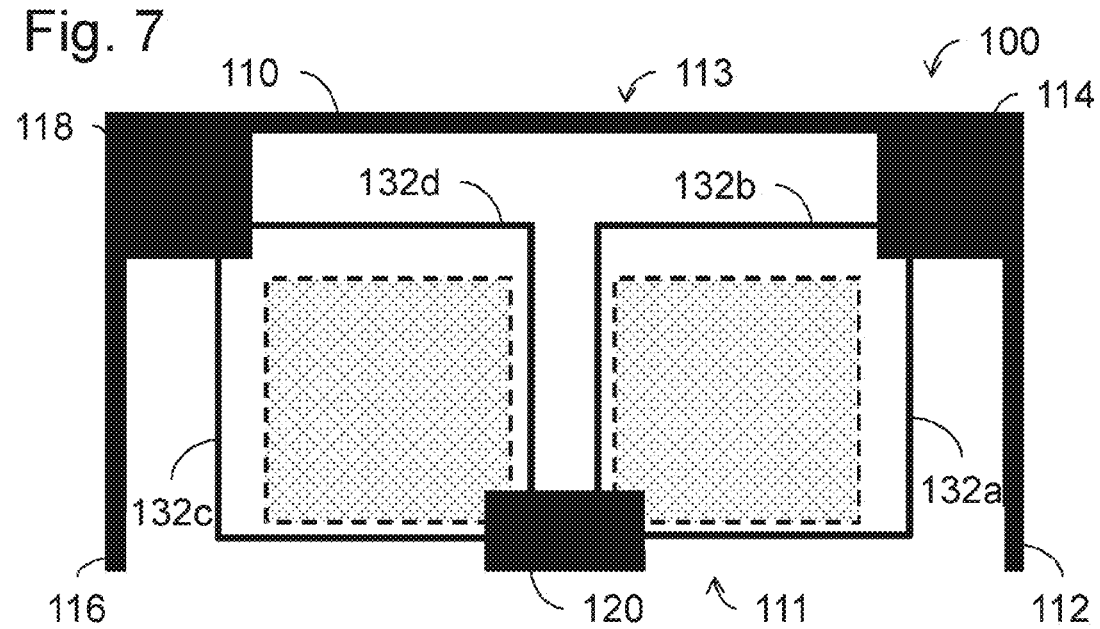
FIG. 7 shows a schematic representation of another torsion spring element.

FIG. 7 shows another variant of the torsion spring element 100. The torsion spring element 100 of FIG. 7 can be understood as a bisection of the torsion spring element 100 of FIG. 6. Accordingly, the torsion spring element 100 of FIG. 7 (with the same size of the longitudinal sides of the torsion spring elements 100 and the same dimensioning of the internal components) has spring constants that are only half as large as the spring constants of the torsion spring element 100 of FIG. 6. In particular, torsion spring elements 100 arranged at different points on the substrate 200, as shown in FIGS. 6 and 7, can be etched in the same process step so that bending beam springs 132, frame structures 110 and anchor structures 120 have exactly the same dimensions. This allows systems to be implemented for which a combination of different torsion spring elements 100 with matching spring constants is advantageous.

In the torsion spring element 100 of FIG. 7, the anchor structure 120 is located at the center of the open longitudinal side 111 of the rectangular frame structure 110 created by bisecting the torsion spring element of FIG. 6. A first bending beam spring 132a and a second bending beam spring 132b form a pairing 135 of bending beam springs 132, as do a third bending beam spring 132c and a fourth bending beam spring 132d. In this process, the first and third bending beam springs 132a, 132c initially run in opposite directions parallel to the longitudinal direction of the frame structure 110 towards a first end 112 and a second end 116 of the frame, respectively. There they kink at 90° and run towards a first corner 114 and a second corner 118, respectively, where they are connected to the frame via respective bases. Perpendicular to the open longitudinal side 111 and parallel to each other, the second and fourth bending beam springs 132b, 132d run towards the closed longitudinal side 113 of the frame, kink at 90° there and run parallel to the closed longitudinal side 113 to the first and second corners 114, 118, respectively, in order to also open out into the bases at that point. Thus, the bending beam spring 100 of FIG. 7 corresponds exactly to the bisection of the bending beam spring of FIG. 6.

Figure 8:
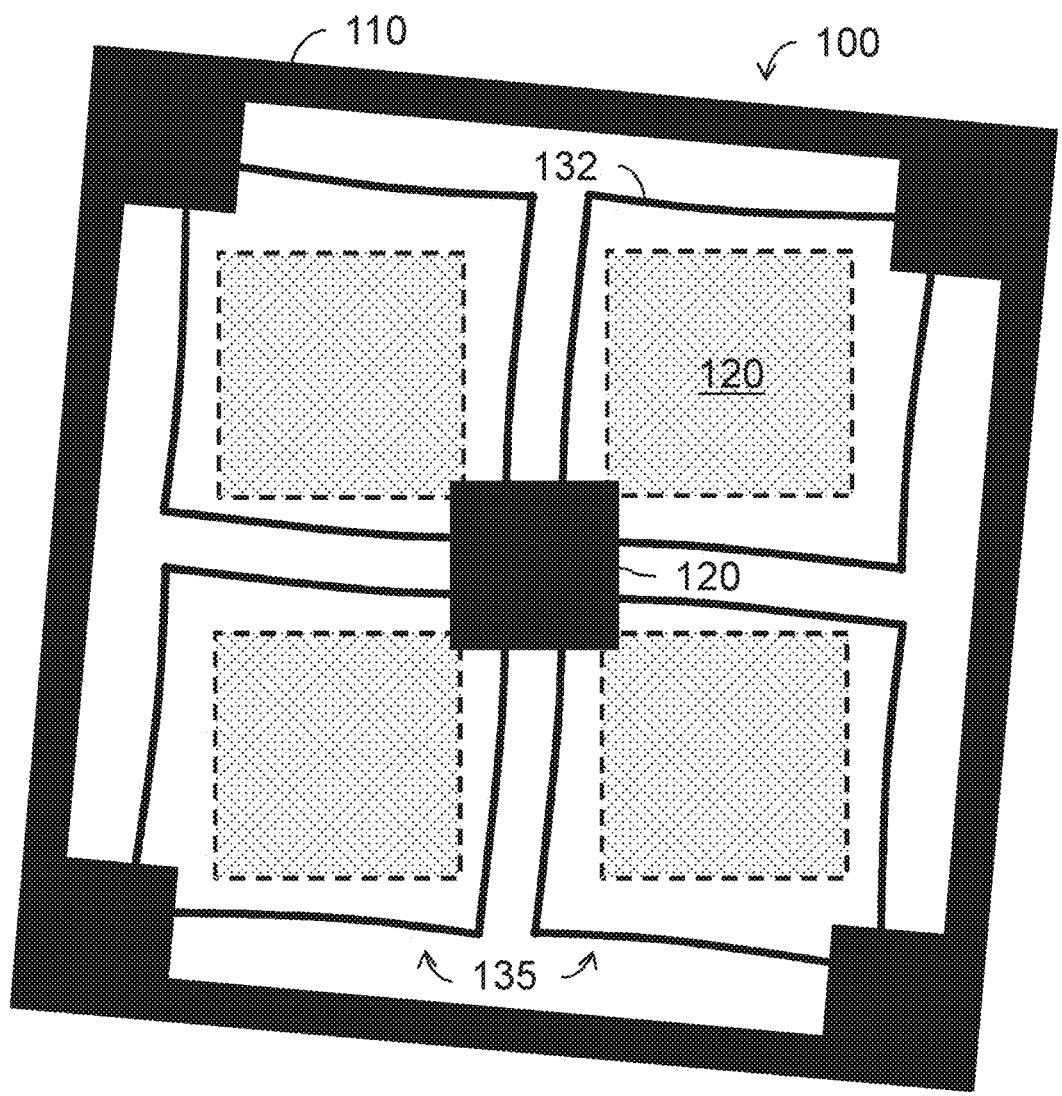
FIG. 8 shows a schematic representation of a rotation of the torsion spring element of FIG. 6.
Figure 9:
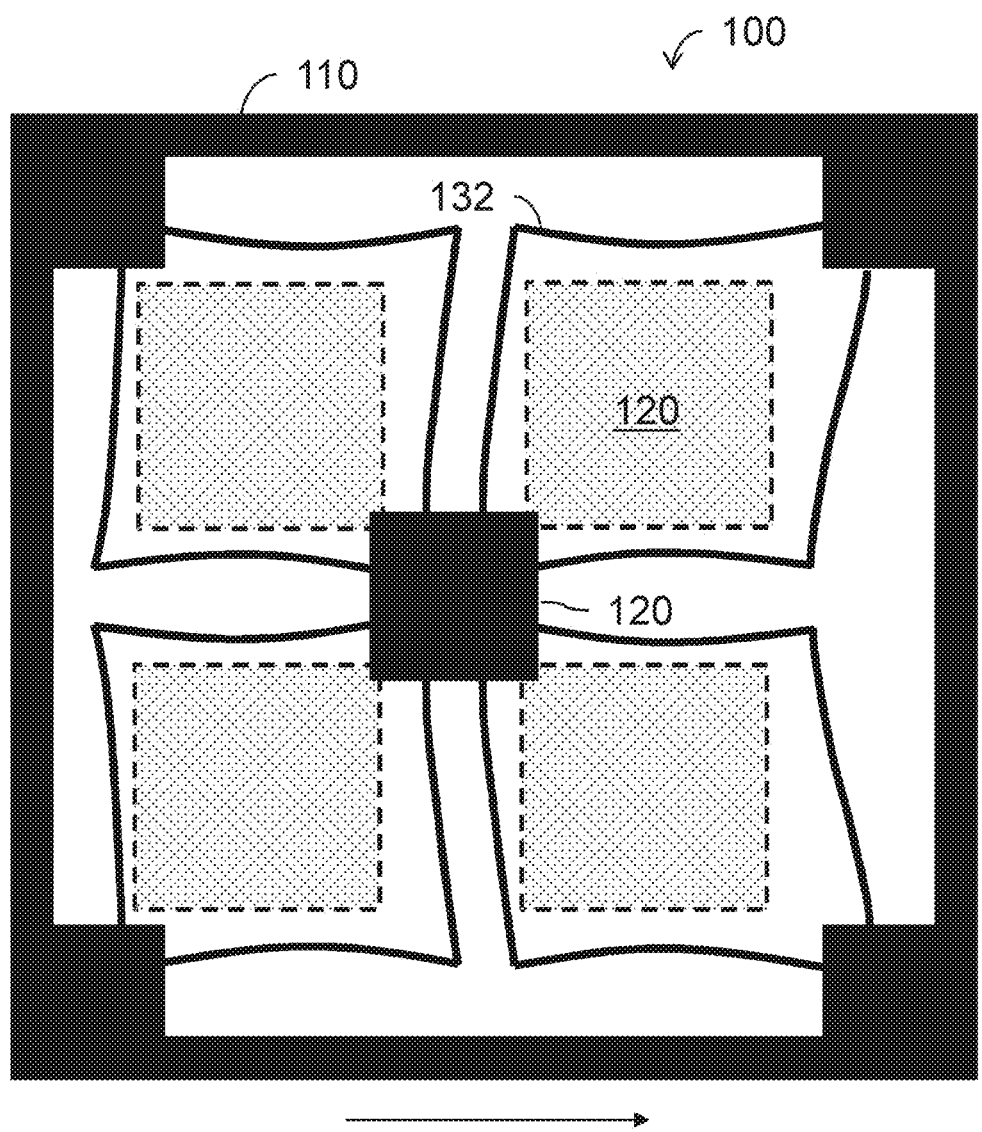
FIG. 9 shows a schematic representation of a translation of the torsion spring element of FIG. 6.

For better illustration, FIGS. 8 and 9 show a rotational movement and a linear movement of the torsion spring element 100 of FIG. 6.

In FIG. 8, the frame structure 110 of the torsion spring element 100 is twisted clockwise relative to the anchor structure 120. Due to this rotation, one bending beam spring 132 of each of the four pairings 135 stretches in each case, while the other bending beam spring 132 compresses. Depending on the dimensions of the bending beam springs 132, the anchor structure 120 and the frame structure 110, this allows relatively large rotations.

As shown in FIG. 9, the same torsion spring element 100 can also achieve linear displacements of the frame structure 110 relative to the anchor structure 120, e.g., in horizontal direction. In so doing, in particular, the sections of the bending beam springs 132 that are perpendicular to the direction of translation bend, while the sections that are in the direction of translation only compress slightly due to the pressure. Since the torsion spring element 100 is built symmetrically, displacements upwards, downwards, left and right occur with the same spring constant. Displacements along the diagonals can be seen as a combination of the purely horizontal and vertical movements and thus occur with correspondingly combined spring constants. In this process, the displacement amplitudes can be relatively large.

As explained above, various functionalities can be achieved in a small space by means of torsion spring elements that are designed in one piece. This offers the possibility to provide novel and/or improved MEMS devices.

Figure 10:
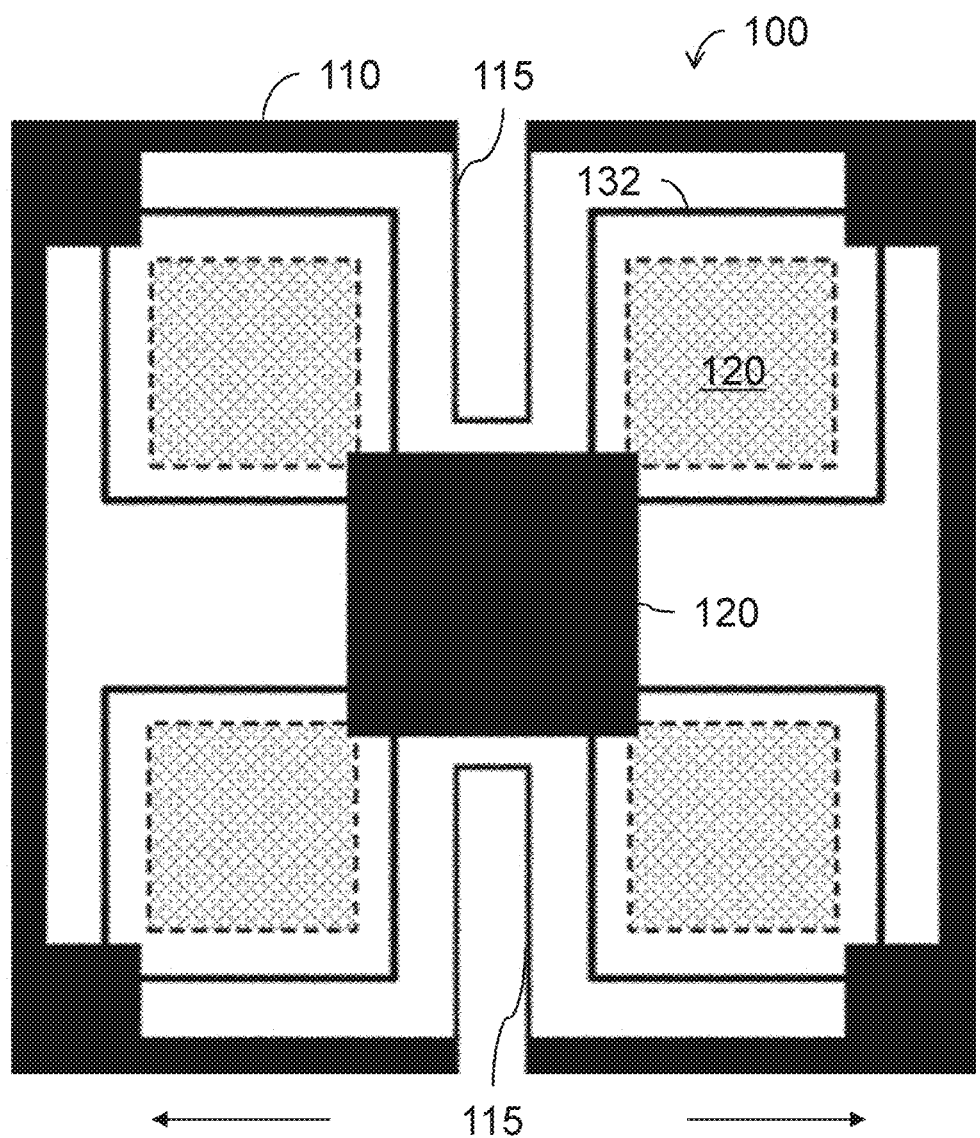
FIG. 10 shows a schematic representation of another torsion spring element.

FIG. 10 shows a variation of the torsion spring element 100 of FIG. 6, in which the frame structure 110 has flexible sections depicted as springs 115 in FIG. 10.

As a result, the torsion spring element 100 has different translational modes. On one hand, translational modes in which the left and right halves of the torsion spring element 100 vibrate in the same direction, i.e., in common mode. These modes correspond essentially to the translations described with reference to FIG. 9.

On the other hand, translational modes can also be induced in which the springs 115 are deformed in such a way that the left and right halves of the torsion spring element move in opposite directions to each other, i.e., in push-pull mode. This is indicated in FIG. 10 by the arrows below the torsion spring element 100.

It goes without saying that springs 115 may alternatively or additionally be accommodated by the parts of the frame structure 110 running vertically in FIG. 10 to cause the halves of the torsion spring element 100 shown on the right and left-hand side to vibrate downward and upward in opposite directions.

The use of partially or fully flexible frame structures 110 can thus provide further flexibility to the functionalities of the torsion spring elements 100 described above.

The invention claimed is:

1. A torsion spring element rotatably connected to a substrate and suitable for use in micro-electro-mechanical devices, wherein
    the torsion spring element can be twisted relative to the substrate, as well as moved linearly relative to the substrate;
    the torsion spring element is designed in one piece and comprises:
        a frame structure;
        an anchor structure preferably arranged within the frame structure; and
        spring structures connecting the anchor structure to the frame structure;
    the anchor structure connects the spring structures and the frame structure to the substrate;
    the frame structure, with deformation of the spring structures, moves as a whole relative to the anchor structure to produce rotational movements and linear movements of the torsion spring element relative to the substrate; and
    the spring structure has at least one pairing of two bending beam springs which extend from the anchor structure at an angle not equal to 0°, each have a kink, converge towards each other after the kink, meet at the frame structure, and are connected to the frame structure at that point.

2. The torsion spring element according to claim 1, wherein
    the spring structure comprises a plurality of said pairings of bending beam springs; and
    adjacent bending beam springs of different pairings extend straight and in parallel from the anchor structure to the respective kink.

3. The torsion spring element according to claim 1, wherein
    the spring structure comprises a plurality of said pairings of bending beam springs; and
    all bending beam springs of the different pairings extend at the same angle from the anchor structure.

4. The torsion spring element according to claim 1, wherein
    the frame structure is a rectangular frame open on one longitudinal side;
    the anchor structure is a base connected to the substrate and located centrally on the open longitudinal side of the frame;
    a first bending beam spring runs from the base parallel to the longitudinal direction of the frame to a first end of the frame, kinks at 90° there and runs to a first corner of the frame and is connected to the frame at that point;
    a second bending beam spring runs from the base perpendicular to the longitudinal direction to a closed longitudinal side of the frame, kinks at 90° there and runs to the first corner of the frame and is connected to the frame at that point;
    a third bending beam spring runs from the base parallel to the longitudinal direction of the frame and opposite to the first bending beam spring to a second end of the frame, kinks at 90° there and runs to a second corner of the frame and is connected to the frame at that point; and
    a fourth bending beam spring runs from the base parallel to the second bending beam spring perpendicular to the longitudinal direction to the closed longitudinal side of the frame, kinks at 90° there and runs opposite to the second bending beam spring to the second corner of the frame and is connected to the frame at that point.

5. The torsion spring element according to claim 1, wherein
    the frame structure is a square frame;
    the anchor structure is a base connected to the substrate at the center of the frame; and
    eight bending beam springs in pairs of two parallel running bending beam springs each run from the base towards the frame, kink at 90° at the frame and run parallel to the frame to the nearest corner of the frame and are connected to the frame at that point.

6. The torsion spring element according to claim 1, wherein
    the frame structure is a circular frame;
    the anchor structure is a base connected to the substrate at the center of the frame;
    pairs of two parallel running bending beams each running like the spokes of a wheel from the base towards the frame, kinking at 90° at the frame and running along the frame; and
    adjacent bending beam springs from adjacent pairs meet in the middle between their respective kink points and are connected to the frame at that point.

* * * * *